March 1, 1932. A. L. DOTTER 1,847,297
APPARATUS FOR PURIFYING AIR
Filed March 7, 1928
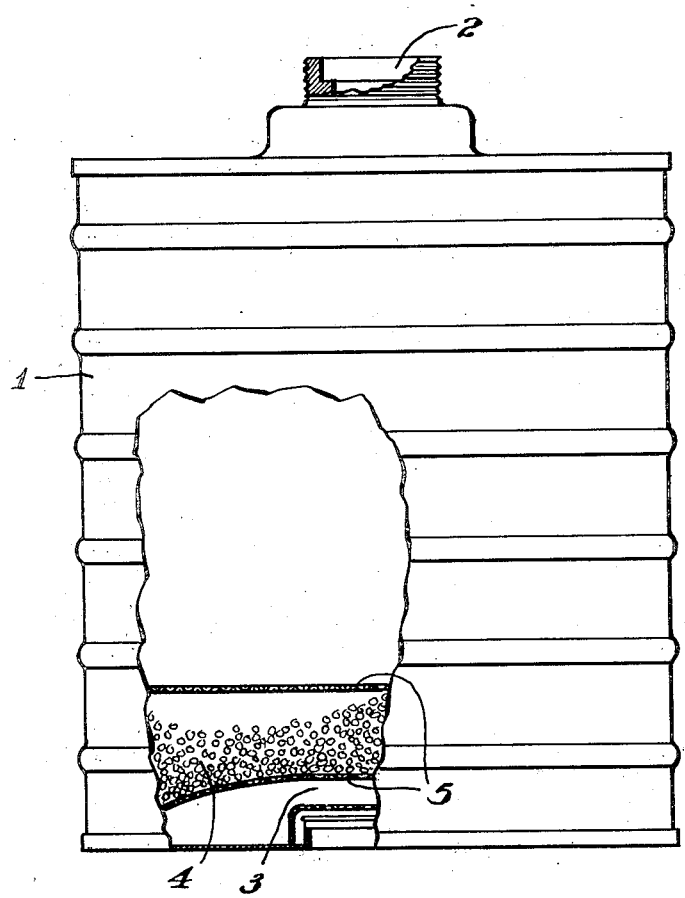
WITNESSES
AB Wallace
F.B. Flick
INVENTOR
Arthur L. Dotter
by Brown & Critchlow
his attorneys.

Patented Mar. 1, 1932

1,847,297

UNITED STATES PATENT OFFICE

ARTHUR L. DOTTER, OF PITTSBURGH, PENNSYLVANIA, ASSIGNOR TO MINE SAFETY APPLIANCES COMPANY, A CORPORATION OF PENNSYLVANIA

APPARATUS FOR PURIFYING AIR

Application filed March 7, 1928. Serial No. 259,707.

The invention relates to air purifying materials, and especially materials for use in gas mask canisters and similar apparatus for rendering air contaminated with deleterious or poisonous substances suitable for breathing.

Various absorbents are now available for removing from air the majority of the industrial and military gases which have a deleterious or damaging effect upon the human system. There are, however, a variety of substances which can penetrate through most of the known absorbents, or in other words which are difficulty absorbed by the respirators or masks now used. In general these substances are of a type which are capable of existing in air in a particulate form, some of them being actually cloud-forming materials, e. g., the substances formed upon combustion of synthetic resins, for example. All of them have in common the property of being irritants to the respiratory tract.

The objects of the invention are to provide an apparatus for removing from air and other gases the irritants of the type referred to, which is simple, efficacious and readily used, makes use of an absorbent that is cheap, effective, readily available, does not lose its efficacy with the passage of time, and is compatible with other materials used for similar purposes, and which is especially adapted for the purification of air to render it suitable for breathing, as by gas masks.

The application of the filtering material provided by this invention to a gas mask canister may be illustrated in connection with the accompanying drawing, which represents a front view, partly in section, of a common form of canister.

The substances which the improved filtering material is especially adapted to remove distinguish themselves from carbon monoxide, phosgene, ammonia and the like (which form solutions in air or other gases) in that when volatilized these materials possess a tendency to condense in the form of minute particles which may remain suspended as a liquid phase in air or other gas for considerable periods of time, some of which may, under suitable conditions, form remarkably persistent clouds. Such substances are typified by chloracetophenone, the vapors resulting from total or partial combustion, or distillation, of synthetic resins, and other organic compounds which may after volatilization remain in the form of a dispersion in air or other gas, the dispersed particles often approaching colloidal size. These substances are met with in military and industrial operations, and particularly in laboratory and industrial fires. For the purpose of distinguishing these substances from the materials which when volatilized form solutions in gases and from ordinary solid phase smokes, they will hereinafter be referred to as dispersed irritants dispersed as a liquid phase.

However, the absorbents now used in gas masks, and especially those used for fire fighting and rescue work, are substantially incapable of removing these liquid phase dispersed irritant materials from the air breathed, with the result that, although other toxic, deleterious, or annoying gases are removed, the persons exposed may still suffer serious irritation of the respiratory organs. With the object of providing adequate protection against such irritants, a large number of experiments were carried out, in which more than fifty of the known absorbents were tested for their power of removing from air the irritant substances produced in partial combustion of objects made from synthetic resins, micarta for example. None of the known absorbents tested were suited for this purpose, they either being totally ineffective or permitting sufficient of the irritants to pass to cause respiratory disturbances. I have found that fully satisfactory protection is given by using a filtering material which comprises a natural vegetable product, such as wood, various grains, certain forms of cellulose, and the like, which can readily be obtained in a form presenting a large exposed or "fluffy" surface, and it is upon this that my invention is predicated. All of these substances contain a polyose, such as starch, cellulose, or lignin, and for that reason they will be referred to herein as polyosic materials.

The filtering material may be used in any desired manner, to remove the particles of the dispersed irritants referred to, from gases in which they are suspended. They are especially adapted for use with gas masks, one such application being shown in the drawing, which shows an absorbent-containing canister 1, provided with the usual air inlet 2 and outlet 3 through which purified air passes to the mask. The canister here represented contains a layer 4 of the new filtering material supported in any suitable manner, as by a screen 5. Other absorbents may also be used in the canister, to remove other substances, without impairing the efficiency of the new absorbent, and without themselves being deleteriously affected.

In its preferred form the filtering material comprises sawdust, or wood particles, this being preferred because such material is readily available, highly efficient, and presents a very large absorbing surface relative to a given weight without disagreeably increasing the normal breathing resistance of the canister. There does not appear to be any particular difference in efficiency between different kinds of woods when used for this purpose. The wood may, of course, be used in other forms, and other polyosic materials may likewise be employed, where desired. For example, cracked or crushed cereal grains may be employed, these possessing substantially the same characteristics for this purpose as the wood sawdust referred to. A common characteristic of the filtering materials used in the preferred embodiment of the invention is that they are granular forms of natural polyosic material.

The new filtering material possesses numerous advantages in addition to the power of removing liquid phase dispersed irritants of the type referred to. It is unnecessary to specially treat these materials in any way to develop or enhance their filtering properties, they being ready for use as crushed, cut, or otherwise prepared. Furthermore, in addition to the advantages previously pointed out, there is no appreciable heat developed during their action, and these materials are readily available in substantially any amount at all localities.

According to the provisions of the patent statutes, I have explained the principle and mode of operation of my invention, and have illustrated and described what I now consider to represent its best embodiment. However, I desire to have it understood that, within the scope of the appended claims, the invention may be practiced by other forms of construction than that particularly illustrated and described.

I claim as my invention:

1. An apparatus for purifying air containing an irritant dispersed as a liquid phase therein to render the air suitable for breathing, comprising a canister adapted for the passage of air therethrough, and having therein a mass of loose granules of a natural material of the group consisting of wood and grains, said mass presenting a large exposed surface area relative to its weight and being effective to remove said liquid phase irritant from air passed through the canister, the canister having a low breathing resistance.

2. An apparatus for purifying air containing an irritant dispersed as a liquid phase therein to render the air suitable for breathing, comprising a canister adapted for the passage of air therethrough, and having therein a mass of loose granules of sawdust, said mass presenting a large exposed surface area relative to its weight and being effective to remove said liquid phase irritant from air passed through the canister, the canister having a low breathing resistance.

In testimony whereof, I sign my name.

ARTHUR L. DOTTER.